(12) United States Patent
Aoki et al.

(10) Patent No.: US 7,491,846 B2
(45) Date of Patent: Feb. 17, 2009

(54) PROCESS FOR PRODUCING HYDROXYLAMINE

(75) Inventors: Takanori Aoki, Kawasaki (JP); Toshitaka Hiro, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 423 days.

(21) Appl. No.: 10/568,107

(22) PCT Filed: Aug. 12, 2004

(86) PCT No.: PCT/JP2004/011854

§ 371 (c)(1),
(2), (4) Date: Feb. 13, 2006

(87) PCT Pub. No.: WO2005/016817

PCT Pub. Date: Feb. 24, 2005

(65) Prior Publication Data

US 2008/0193362 A1    Aug. 14, 2008

Related U.S. Application Data

(60) Provisional application No. 60/541,070, filed on Feb. 3, 2004, provisional application No. 60/496,666, filed on Aug. 21, 2003.

(30) Foreign Application Priority Data

Aug. 13, 2003 (JP) ............................. 2003-293143
Jan. 28, 2004 (JP) ............................. 2004-020217

(51) Int. Cl.
C07C 239/08 (2006.01)
(52) U.S. Cl. ..................... 564/300; 564/301
(58) Field of Classification Search ............. None
See application file for complete search history.

(56) References Cited

U.S. PATENT DOCUMENTS

| | | | |
|---|---|---|---|
| 4,707,294 A | 11/1987 | Mathew et al. | |
| 5,472,679 A | 12/1995 | Levinthal et al. | |
| 6,235,162 B1 | 5/2001 | Sharifian et al. | |
| 6,299,734 B1 | 10/2001 | Watzenberger et al. | |
| 6,485,700 B1 | 11/2002 | Bansho et al. | |
| 6,524,545 B1 | 2/2003 | Watzenberger et al. | |

FOREIGN PATENT DOCUMENTS

| | | | |
|---|---|---|---|
| DE | 35 28 463 A1 | | 2/1987 |
| DE | 197 33 681 A1 | | 2/1999 |
| JP | 2000-510385 A | | 8/2000 |
| JP | 2001-513479 A | | 9/2001 |
| JP | 2002-12415 A | | 1/2002 |
| JP | 2002-504062 A | | 2/2002 |
| JP | 2002-68718 A | | 3/2002 |
| JP | 2002-068719 | * | 3/2002 |
| JP | 2002-68719 A | | 3/2002 |
| WO | WO 97/22550 A1 | | 6/1997 |
| WO | WO 98/57886 A1 | | 12/1998 |
| WO | WO 99/07637 A1 | | 2/1999 |

OTHER PUBLICATIONS

Database CA 'Online! Chemical Abstracts Service, Columbus, Ohio, US; Kumiko Bansho, et al., "Production of Free Hydroxylamine, Aqueous Solution With High Yield", XP002350144, Retrieved From STN, Database Accession No. 136:202673, Abstract, 2002.

* cited by examiner

*Primary Examiner*—Brian J Davis
(74) *Attorney, Agent, or Firm*—Sughrue Mion, PLLC

(57) ABSTRACT

It is an object of the present invention to provide a process for producing a hydroxylamine by reacting a salt of hydroxylamine with an alkali compound, where the yield reduction due to formation of a complex between the produced hydroxylamine and a salt produced as a by-product or adsorption of the hydroxylamine to the by-product salt is decreased, and a high-concentration and high-purity hydroxylamine is safely produced at a high yield.

The process for producing a hydroxylamine of the present invention comprises a reaction step of reacting a salt of hydroxylamine with an alkali compound to obtain a hydroxylamine while keeping the reaction solution at a pH of 7 or more, a purification step of purifying the hydroxylamine by ion exchange, and a concentration step of concentrating the hydroxylamine by distillation at the column bottom.

36 Claims, No Drawings

PROCESS FOR PRODUCING HYDROXYLAMINE

CROSS REFERENCES OF RELATED APPLICATION

This application is the national stage application under 35 U.S.C. §371 of PCT/JP2004/011854 filed Aug. 12, 2004 claiming benefit pursuant to 35 U.S.C. §119(e) of the filing dates of Provisional Application No. 60/496,666 filed on Aug. 21, 2003 and 60/541,070 filed on Feb. 3, 2004 pursuant to 35 U.S.C. §111(b).

TECHNICAL FIELD

The present invention relates to a process for producing a hydroxylamine by reacting a salt of hydroxylamine with an alkali compound, where a high-concentration and high-purity hydroxylamine is safely produced at a high yield.

BACKGROUND ART

Hydroxylamines and salts thereof are being used in industry over a wide range of uses such as raw material of intermediate for medicines or agrochemicals, surface-treating agent for metal, fiber treatment or dyeing. Free hydroxylamines have a very unstable property, for example, these readily undergo decomposition in the presence of metal ion (particularly, heavy metal ion) under the high-temperature or high-concentration condition. Accordingly, in general, a salt of hydroxylamine, which is relatively stable, is produced and used.

However, in many uses, a hydroxylamine is more preferred than a salt of hydroxylamine and also, an aqueous hydroxylamine solution in a high concentration is often required. Furthermore, for use in electronic industry, a high-purity hydroxylamine having less metal impurities is required. In order to meet these requirements, attempts are being made to suppress the decomposition reaction and efficiently and safely produce a high-concentration aqueous hydroxylamine solution.

For example, German Patent Publication No. 3,528,463 (Patent Document 1) discloses a process of adding an oxide and/or a hydroxide of calcium, strontium or barium to an aqueous hydroxylamine sulfate solution having a small ammonium ion content, performing the reaction at a temperature of 20° C. or less and removing by separation the insoluble sulfate.

JP-A-2002-12415 (Patent Document 2) discloses a process of producing a hydroxylamine by adding a slurry of calcium oxide and/or calcium hydroxide to an aqueous solution containing hydroxylamine sulfate, thereby performing the reaction, where the reaction is performed in the state that calcium sulfate as the seed slurry is always present in the reaction system, as a result, the particle size of insoluble sulfate is increased to enhance the filtration efficiency and a hydroxylamine is efficiently produced.

However, these conventional processes of adding an alkali compound to an aqueous solution containing hydroxylamine sulfate have a problem that the produced hydroxylamine forms a complex with a sulfate produced as a by-product or adsorbs to the sulfate and the yield of hydroxylamine decreases.

Also, JP-A-2000-510385 (Patent Document 3) describes a process of separating an aqueous solution containing a hydroxylamine and a salt into an aqueous hydroxylamine solution and a salt fraction by stripping.

JP-A-2001-513479 (Patent Document 4) describes a process of treating a salt of hydroxylamine with a base and separating the produced solution into an aqueous hydroxylamine solution and a salt fraction.

JP-A-2002-504062 (Patent Document 5) describes a process of concentrating an aqueous hydroxylamine solution by distillation, removing the hydroxylamine-containing vapor from the side face at the column bottom, and concentrating the vapor.

U.S. Pat. No. 6,235,162 (Patent Document 6) describes a process of obtaining a hydroxylamine by extracting a hydroxylamine from the column top by distillation and further distilling the obtained distillate.

JP-A-2002-68718 (Patent Document 7) describes a process of distilling out a hydroxylamine from the column top by simply distilling an aqueous hydroxylamine solution.

However, these processes have a problem that at the time of obtaining a hydroxylamine from the column top or side by distillation, the hydroxylamine may undergo decomposition or explosion due to distillation at a high temperature.

| [Patent Document 1] | German Patent Publication No. 3,528,463 |
| [Patent Document 2] | JP-A-2002-12415 |
| [Patent Document 3] | JP-A-2000-510385 |
| [Patent Document 4] | JP-A-2001-513479 |
| [Patent Document 5] | JP-A-2002-504062 |
| [Patent Document 6] | U.S. Pat. No. 6,235,162 |
| [Patent Document 7] | JP-A-2002-68718 |

DISCLOSURE OF INVENTION

An object of the present invention is to provide a process for producing a hydroxylamine by reacting a salt of hydroxylamine with an alkali compound, where the yield reduction due to formation of a complex between the produced hydroxylamine and a salt produced as a by-product or adsorption of the hydroxylamine to the by-product salt is suppressed and a high-concentration hydroxylamine is produced at a high yield.

Also, an object of the present invention is to provide a process for producing a hydroxylamine by reacting a salt of hydroxylamine with an alkali compound, where a high-concentration and high-purity hydroxylamine is safely produced at a high yield.

As a result of intensive investigations to solve those problems, the present inventors have found that a hydroxylamine can be produced at a high yield when the reaction is performed by adding a salt of hydroxylamine to a reaction solution containing an alkali compound, and also that a hydroxylamine can be produced at a high yield by performing the reaction while keeping a reaction solution containing a salt of hydroxylamine and an alkali compound at a pH of 7 or more.

Also, the present inventors have found that a high-concentration and high-purity hydroxylamine can be safely produced at a high yield by combining, for example, a reaction step of reacting a salt of hydroxylamine with an alkali compound to obtain a hydroxylamine, a separation step, if desired, of separating by solid-liquid separation insoluble substances precipitated in the reaction solution from the hydroxylamine obtained in the reaction step, a purification step of purifying by ion exchange the hydroxylamine obtained in the separation step, and a concentration step of concentrating the hydroxylamine obtained in the purification step, by distillation at the column bottom.

According to the knowledge of the present inventors, when the production process of the present invention is used, the produced hydroxylamine does not form a complex with a salt produced as a by-product and the amount of hydroxylamine adsorbed to the by-product salt is small, so that a high-concentration and high-purity hydroxylamine can be safely obtained at a high yield. This knowledge has been found out for the first time by the present inventors.

The present invention has been made based on this knowledge and relates to (1) to (39) below.

(1) A process for producing a hydroxylamine by reacting a salt of hydroxylamine with an alkali compound, comprising a reaction step of reacting a salt of hydroxylamine with an alkali compound while keeping the reaction solution at a pH of 7 or more.

(2) A process for producing a hydroxylamine by reacting a salt of hydroxylamine with an alkali compound, comprising a reaction step of performing the reaction by adding a salt of hydroxylamine to a reaction solution containing an alkali compound.

(3) The process for producing a hydroxylamine as described in (2), wherein the reaction step is performed while keeping the reaction solution at a pH of 7 or more.

(4) The process for producing a hydroxylamine as described in any one of (1) to (3), wherein the alkali compound is at least one compound selected from the group consisting of an alkali metal compound, an alkaline earth metal compound, an ammonia and an amine.

(5) The process for producing a hydroxylamine as described in any one of (1) to (4), wherein the salt of hydroxylamine is at least one salt selected from the group consisting of hydroxylamine sulfate, hydroxylamine hydrochloride, hydroxylamine nitrate and hydroxylamine phosphate.

(6) The process for producing a hydroxylamine as described in any one of (1) to (5), wherein the reaction temperature at the reaction step is from 0 to 80° C.

(7) The process for producing a hydroxylamine as described in any one of (1) to (6), wherein the reaction step is performed in the presence of a solvent containing water and/or an alcohol.

(8) The process for producing a hydroxylamine as described in any one of (1) to (7), wherein the reaction step is performed in the presence of a stabilizer.

(9) The process for producing a hydroxylamine as described in any one of (1) to (8), which comprises a separation step of separating insoluble substances from the hydroxylamine.

(10) The process for producing a hydroxylamine as described in (9), wherein the temperature at the separation step is from 0 to 80° C.

(11) The process for producing a hydroxylamine as described in (9) or (10), wherein at least a part of the reaction solution after separating insoluble substances in the separation step is used as a solvent for dissolving or suspending a salt of hydroxylamine and/or an alkali compound which are reaction raw materials.

(12) The process for producing a hydroxylamine as described in any one of (1) to (11), which comprises a purification step of purifying the hydroxylamine.

(13) The process for producing a hydroxylamine as described in (12), wherein the purification step is a step of purifying the hydroxylamine by at least one method selected from the group consisting of distillation, ion exchange, electrodialysis, membrane separation, adsorption and crystallization.

(14) The process for producing a hydroxylamine as described in (12) or (13), wherein at least a part of the hydroxylamine solution obtained in the purification step is used as a solvent for dissolving or suspending a salt of hydroxylamine and/or an alkali compound which are reaction raw materials.

(15) The process for producing a hydroxylamine as described in any one of (1) to (14), which comprises a concentration step of concentrating the hydroxylamine.

(16) The process for producing a hydroxylamine as described in (15), wherein the concentration step is a step of concentrating the hydroxylamine by distillation at the column bottom.

(17) The process for producing a hydroxylamine as described in (15) or (16), wherein the temperature at the concentration step is from 0 to 70° C.

(18) The process for producing a hydroxylamine as described in (15) to (17), wherein at least a part of the hydroxylamine solution obtained in the concentration step is used as a solvent for dissolving or suspending a salt of hydroxylamine and/or an alkali compound which are reaction raw materials.

(19) The process for producing a hydroxylamine as described in (15) to (18), which further comprises a purification step of purifying the hydroxylamine by ion exchange after the concentration step.

(20) A process for producing a hydroxylamine, comprising a reaction step of reacting a salt of hydroxylamine with an alkali compound to obtain a hydroxylamine, a purification step of purifying the hydroxylamine by ion exchange, and a concentration step of concentrating the hydroxylamine by distillation at the column bottom.

(21) The process for producing a hydroxylamine as described in (20), wherein the steps for producing a hydroxylamine are performed in the order of a reaction step, a purification step and a concentration step.

(22) The process for producing a hydroxylamine as described in (20) or (21), wherein each of the steps is performed in the presence of a stabilizer.

(23) The process for producing a hydroxylamine as described in (20), which comprises a separation step of separating insoluble substances from the hydroxylamine.

(24) The process for producing a hydroxylamine as described in (23), wherein the temperature at the separation step is from 0 to 80° C.

(25) The process for producing a hydroxylamine as described in (23) or (24), wherein the steps for producing a hydroxylamine are performed in the order of a reaction step, a separation step, a purification step and a concentration step.

(26) The process for producing a hydroxylamine as described in any one of (23) to (25), wherein each of the steps is performed in the presence of a stabilizer.

(27) The process for producing a hydroxylamine as described in any one of (23) to (26), wherein at least a part of the reaction solution after separating insoluble substances in the separation step is used as a solvent for dissolving or suspending a salt of hydroxylamine and/or an alkali compound which are reaction raw materials.

(28) The process for producing a hydroxylamine as described in any one of (20) to (27), wherein the reaction step is performed while keeping the reaction solution at a pH of 7 or more.

(29) The process for producing a hydroxylamine as described in (28), wherein the reaction step is a step of adding a salt of hydroxylamine to a reaction solution containing an alkali compound.

(30) The process for producing a hydroxylamine as described in any one of (20) to (29), wherein the reaction temperature at the reaction step is from 0 to 80° C.

(31) The process for producing a hydroxylamine as described in any one of (20) to (30), wherein the reaction step is performed in the presence of a solvent containing water and/or an alcohol.

(32) The process for producing a hydroxylamine as described in any one of (20) to (31), wherein the temperature at the purification step is from 0 to 70° C.

(33) The process for producing a hydroxylamine as described in any one of (20) to (32), wherein at least a part of the hydroxylamine solution obtained in the purification step is used as a solvent for dissolving or suspending a salt of hydroxylamine and/or an alkali compound which are reaction raw materials.

(34) The process for producing a hydroxylamine as described in (20) to (33), wherein the temperature at the concentration step is from 0 to 70° C.

(35) The process for producing a hydroxylamine as described in any one of (20) to (34), wherein at least a part of the hydroxylamine solution obtained in the concentration step is used as a solvent for dissolving or suspending a salt of hydroxylamine and/or an alkali compound which are reaction raw materials.

(36) The process for producing a hydroxylamine as described in any one of (20) to (35), which further comprises a purification step of purifying the hydroxylamine by ion exchange after the concentration step.

(37) The process for producing a hydroxylamine as described in (36), wherein the temperature at the purification step after the concentration step is from 0 to 70° C.

(38) The process for producing a hydroxylamine as described in any one of (20) to (37), wherein the salt of hydroxylamine is at least one compound selected from the group consisting of hydroxylamine sulfate, hydroxylamine hydrochloride, hydroxylamine nitrate and hydroxylamine phosphate.

(39) The process for producing a hydroxylamine as described in any one of (20) to (38), wherein the alkali compound is at least one compound selected from the group consisting of an alkali metal compound, an alkaline earth metal compound, an ammonia and an amine.

EFFECT OF THE INVENTION

According to the present invention, the yield reduction due to formation of a complex between the produced hydroxylamine and a salt produced as a by-product or adsorption of the hydroxylamine to the by-product salt can be greatly decreased and a high-concentration and high-purity hydroxylamine can be safely and efficiently produced from a salt of hydroxylamine at a high yield.

BEST MODE FOR CARRYING OUT THE INVENTION

The production process of a hydroxylamine according to the present invention is described in detail below.

Reaction Step

The production process of a hydroxylamine of the present invention comprises a reaction step of reacting a salt of hydroxylamine with an alkali compound to obtain a hydroxylamine.

The salt of hydroxylamine for use in the present invention includes an inorganic acid salt of hydroxylamine, such as sulfate, hydrochloride, nitrate, phosphate, hydrobromate, sulfite, phosphite, perchlorate, carbonate and hydrogencarbonate, and an organic acid salt of hydroxylamine, such as formate, acetate and propionate. Among these, preferred is at least one salt selected from the group consisting of hydroxylamine sulfate ($NH_2OH.1/2H_2SO_4$), hydroxylamine hydrochloride ($NH_2OH.HCl$), hydroxylamine nitrate ($NH_2OH.HNO_3$) and hydroxylamine phosphate ($NH_2OH.1/3H_3PO_4$).

The salt of hydroxylamine is not particularly limited as long as it is commercially or industrially available, but those having less metal impurities are preferred, because if metal impurities are present, these impurities sometimes accelerate decomposition of the salt of hydroxylamine or the produced hydroxylamine. However, impurities having no effect on the decomposition of the salt of hydroxylamine or the hydroxylamine and being removable at the purification step or the like, or impurities not raising a problem in use of hydroxylamine may be contained.

The salt of hydroxylamine may be used in the form of an intact solid or may be used after dissolving or suspending it in a solvent. The solvent which can be used includes water and/or an organic solvent. Examples of the organic solvent include a hydrocarbon, an ether and an alcohol, but if the reaction is not affected, the solvent is not limited thereto. Among these solvents, a solvent containing water and/or an alcohol is preferred. Also, at least a part of the filtrate resulting from separation of insoluble salts or the like generated at the reaction may be used as the solvent.

The amount of the solvent may be appropriately selected according to the conditions such as amount of the salt of hydroxylamine used and reaction temperature. The amount of the solvent is, in terms of a ratio by mass of the solvent to the salt of hydroxylamine (solvent/salt of hydroxylamine), usually from 0.1 to 1,000, preferably from 1 to 100.

The alkali compound for use in the present invention is preferably at least one compound selected from the group consisting of an alkali metal-containing compound, an alkaline earth metal-containing compound, an ammonia and an amine.

Examples of the alkali metal-containing compound include oxides, hydroxides and carbonates of lithium, sodium, potassium, rubidium and cesium. Among these, preferred are hydroxides and carbonates of sodium and potassium.

Examples of the alkaline earth metal-containing compound include oxides, hydroxides and carbonates of beryllium, magnesium, calcium, strontium and barium. Among these, preferred are oxides and hydroxides of magnesium, calcium, strontium and barium.

The ammonia may be used in the form of a gas or a solution having dissolved therein ammonia, for example, an aqueous ammonia solution.

As for the amine, a primary amine, a secondary amine and a tertiary amine can be used. Also, the amine may be a monoamine, a polyamine having two or more amino groups within the molecule, such as diamine and triamine, or a cyclic amine.

Examples of the monoamine include methylamine, dimethylamine, trimethylamine, ethylamine, diethylamine, triethylamine, n-propylamine, di-n-propylamine, tri-n-propylamine, i-propylamine, di-i-propylamine, tri-i-propylamine, n-butylamine, di-n-butylamine, tri-n-butylamine, i-butylamine, di-i-butylamine, tri-i-butylamine, sec-butylamine, di-sec-butylamine, tri-sec-butylamine, tert-butylamine, di-tert-butylamine, tri-tert-butylamine, allylamine, diallylamine, triallylamine, cyclohexylamine, dicyclohexylamine, tricyclohexylamine, n-octylamine, di-n-octylamine, tri-n-octylamine, benzylamine, dibenzylamine, tribenzylamine, diaminopropylamine, 2-ethylhexylamine, 3-(2-ethylhexyloxy)propylamine, 3-methoxypropylamine, 3-ethoxypropylamine, 3-(diethylamino)propylamine, bis(2-ethylhexyl)amine, 3-(dibutylamino)propylamine, α-phenylethylamine, β-phenylethylamine, aniline, N-methylaniline, N,N-dimethylaniline, diphenylamine, triphenylamine, o-toluidine, m-toluidine, p-toluidine, o-anisidine, m-anisidine, p-anisidine, o-chloroaniline, m-chloroaniline, p-chloroaniline, o-bromoaniline, m-bromoaniline, p-bromoaniline, o-nitroaniline, m-nitroaniline, p-nitroaniline, 2,4-dinitroaniline, 2,4,6-trinitroaniline, p-aminobenzoic acid, sulfanilic acid, sulfanilamide, monoethanolamine, diethanolamine and triethanolamine.

Examples of the diamine include 1,2-diaminoethane, N,N,N',N'-tetramethyl-1,2-diaminoethane, N,N,N',N'-tetra-ethyl-1,2-diaminoethane, 1,3-diaminopropane, N,N,N',N'-tetramethyl-1,2-diaminopropane, N,N,N',N'-tetraethyl-1,2-diaminopropane, 1,4-diaminobutane, N-methyl-1,4-diamino-butane, 1,2-diaminobutane, N,N,N',N'-tetramethyl-1,2-diaminobutane, 3-aminopropyldimethylamine, 1,6-diamino-hexane, 3,3-diamino-N-methyldipropylamine, 1,2-phenylene-diamine, 1,3-phenylenediamine, 1,4-phenylenediamine and benzidine.

Examples of the triamine include 2,4,6-triaminophenol, 1,2,3-triaminopropane, 1,2,3-triaminobenzene, 1,2,4-triaminobenzene and 1,3,5-triaminobenzene.

Examples of the tetramine include β,β',β''-triamino-triethylamine.

Examples of the cyclic amine include pyrrole, pyridine, pyrimidine, pyrrolidine, piperidine, purine, imidazole, oxazole, thiazole, pyrazole, 3-pyrroline, quinoline, isoquinoline, carbazole, piperazine, pyridazine, 1,2,3-triazine, 1,2,4-triazine, 1,3,5-triazine, 1,2,3-triazole, 1,2,5-triazole, 1,2,4-triazole, 1,3,4-triazole and morpholine.

The amine which can be used as the alkali compound for use in the present invention is not limited to the compounds described above and may be, for example, an asymmetric compound differing in the kind of substituent, such as ethylmethylamine. Also, one amine may be used alone or two or more amines may be used in combination.

The alkali compound for use in the present invention is not particularly limited as long as it is commercially or industrially available, but similarly to the salt of hydroxylamine, those having less metal impurities are preferred.

The alkali compound can be used after dissolving or suspending it in a solvent. The solvent which can be used here includes water and/or an organic solvent. Examples of the organic solvent include a hydrocarbon, an ether and an alcohol, but if the reaction is not affected, the solvent is not limited thereto. Among these solvents, water and/or an alcohol are preferred. Also, at least a part of the filtrate resulting from separation of insoluble salts or the like generated at the reaction may be used as the solvent.

The amount of the solvent may be appropriately selected according to the conditions such as amount of the alkali compound used and reaction temperature. The amount of the solvent is, in terms of a ratio by mass of the solvent to the alkali compound (solvent/alkali compound), usually from 0.5 to 1,000, preferably from 0.8 to 100.

In the production process of a hydroxylamine of the present invention, the reaction step of reacting a salt of hydroxylamine with an alkali compound to obtain a hydroxylamine may be performed in the presence of a stabilizer. The stabilizer may be a known stabilizer. Examples thereof include 8-hydroxyquinoline, N-hydroxyethylethylenediamine-N,N,N'-triacetic acid, glycine, ethylenediaminetetraacetic acid, cis-1,2-diaminocyclohexane-N,N,N',N'-tetraacetic acid, trans-1,2-diaminocyclohexane-N,N,N',N'-tetraacetic acid, N,N'-di(2-hydroxybenzyl)ethylenediamine-N,N'-diacetic acid, N-hydroxyethyliminodiacetic acid, N,N'-dihydroxyethylglycine, diethylenetriaminepentaacetic acid, ethylenebis(oxyethylenenitrilo)tetraacetic acid, bishexamethylenetriaminepentaacetic acid, hexamethylenediaminetetraacetic acid, triethylenetetraminehexaacetic acid, tris(2-aminoethyl)aminehexaacetic acid, iminodiacetic acid, polyethyleneimine, polypropyleneimine, o-aminoquinoline, 1,10-phenanthroline, 5-methyl-1,10-phenanthroline, 5-chloro-1,10-phenanthroline, 5-phenyl-1,10-phenanthroline, hydroxyanthraquinone, 8-hydroxyquinoline-5-sulfonic acid, 8-hydroxymethylquinoline, thioglycolic acid, thiopropionic acid, 1-amino-2-mercapto-propionic acid, 2,2-dipyridyl, 4,4-dimethyl-2,2-dipyridyl, ammonium thiosulfate, benzotriazole, flavone, morin, quercetin, gossypetin, robinetin, luteolin, fisetin, apigenin, galangin, chrysin, flavonol, pyrogallol, oxyanthraquinone, 1,2-dioxyanthraquinone, 1,4-dioxyanthraquinone, 1,2,4-trioxyanthraquinone, 1,5-dioxyanthraquinone, 1,8-dioxyanthraquinone, 2,3-dioxyanthraquinone, 1,2,6-trioxyanthraquinone, 1,2,7-trioxyanthraquinone, 1,2,5,8-tetraoxyanthraquinone, 1,2,4,5,8-pentaoxyanthraquinone, 1,6,8-dioxy-3-methyl-6-methoxyanthraquinone, quinalizarin, flavan, lactone, 2,3-dihydrohexono-1,4-lactone, 8-hydroxyquinaldine, 6-methyl-8-hydroxyquinaldine, 5,8-dihydroxyquinaldine, anthocyan, pelargonidin, cyanidin, delphinidin, paeonidin, petunidin, malvidin, catechin, sodium thiosulfate, nitrilotriacetic acid, 2-hydroxyethyldisulfide, 1,4-dimercapto-2,3-butanediol, hydrochloride of thiamine, catechol, 4-tert-butylcatechol, 2,3-dihydroxynaphthalene, 2,3-dihydroxybenzoic acid, 2-hyroxypyridine-N-oxide, 1,2-dimethyl-3-hydroxypyridin-4-one, 4-methylpyridine-N-oxide, 6-methylpyridine-N-oxide, 1-methyl-3-hydroxypyridin-2-one, 2-mercaptobenzothiazole, 2-mercaptocyclohexylthiazole, 2-mercapto-6-tert-butylcyclohexylthiazole, 2-mercapto-4,5-dimethylthiazoline, 2-mercaptothiazoline, 2-mercapto-5-tert-butylthiazoline, tetramethylthiuramdisulfide, tetra-n-butylthiuramdisulfide, N,N'-diethylthiuramdisulfide, tetraphenylthiuramdisulfide, thiuramdisulfide, thiourea, N,N'-diphenylthiourea, di-o-tolylthiourea, ethylenethiourea, thiocetamide, 2-thiouracil, thiocyanuric acid, thioformamide, thioacetamide, thiopropionamide, thiobenzamide, thionicotinamide, thioacetanilide, thiobenzanilide, 1,3-dimethylthiourea, 1,3-diethyl-2-thiourea, 1-phenyl-2-thiourea, 1,3-diphenyl-2-thiourea, thiocarbazide, thiosemicarbazide, 4,4-dimethyl-3-thiosemicarbazide, 2-mercaptoimidazoline, 2-thiohydantoin, 3-thiourazole, 2-thiouramil, 4-thiouramil, thiopentanol, 2-thiobarbituric acid, thiocyanuric acid, 2-mercaptoquinoline, 2-mercapto-4H-3,1-benzoxazine, 2-mercapto-4H-3,1-benzothiazine, thiosaccharin, 2-mercaptobenzimidazole, trimethylphosphite, triethylphosphite, triphenylphosphite, trimethylphosphine, triethylphosphine and triphenylphosphine.

One of these stabilizers may be used alone or two or more thereof may be used in combination. By adding the stabilizer, the salt of hydroxylamine or the hydroxylamine can be prevented from decomposition due to metal impurities or the like.

The stabilizer for use in the present invention is not particularly limited as long as it is commercially or industrially available, but similarly to the salt of hydroxylamine, those having less metal impurities are preferred.

The ratio by mass of the stabilizer to the salt of hydroxylamine (stabilizer/salt of hydroxylamine) is suitably from $1.0 \times 10^{-9}$ to 1.0, preferably from $1.0 \times 10^{-8}$ to 0.1. If this ratio by mass is less than $1.0 \times 10^{-9}$, the effect of preventing the salt of hydroxylamine or the hydroxylamine from decomposition reaction due to metal impurities may not be obtained, whereas if the ratio by mass exceeds 1.0, removal or recovery of the excess stabilizer may be required.

The stabilizer may be used in the form of an intact solid or may be used after dissolving it in a solvent. The solvent which can be used here includes water and/or an organic solvent. Examples of the organic solvent include a hydrocarbon, an ether, an ester and an alcohol, but if the reaction is not affected, the solvent is not limited thereto. Among these solvents, water and/or an alcohol are preferred. The amount of the solvent may be appropriately selected according to the conditions such as kind and amount of the stabilizer used and reaction temperature.

The production process of a hydroxylamine of the present invention comprises a reaction step of performing the reaction by adding a salt of hydroxylamine to a reaction solution prepared by, as described above, dissolving or suspending an alkali compound in a solvent. When such a method of adding a salt of hydroxylamine to a reaction solution containing an alkali compound is used, the produced hydroxylamine hardly forms a complex with a salt produced as a by-product and is less adsorbed to or taken into the by-product insoluble salt.

At the time of adding a salt of hydroxylamine to a reaction solution containing an alkali compound, the salt of hydroxylamine is preferably added while keeping the reaction solution at a pH of 7 or more, more preferably 7.5 or more, still more preferably 8 or more. When the reaction solution is kept at a pH within this range, the produced hydroxylamine hardly forms a complex with a salt produced as a by-product and is less adsorbed to or taken into the by-product insoluble salt.

In the reaction step of the present invention, it may be also possible to add an alkali compound to a reaction solution having dissolved or suspended therein a salt of hydroxylamine.

Furthermore, the reaction step in the production process of a hydroxylamine of the present invention may be a reaction step of performing the reaction by simultaneously supplying a salt of hydroxylamine and an alkali compound. At this time, the amounts added of the salt of hydroxylamine and the alkali compound are preferably adjusted while keeping the reaction solution at a pH of 7 or more, more preferably 7.5 or more, still more preferably 8 or more. The salt of hydroxylamine and/or the alkali compound each may be added in the form of an intact solid or may be added after dissolving or suspending it in a solvent. In the case where the alkali compound is ammonia or the like, the alkali compound may also be introduced in the form of a gas.

In the production process of a hydroxylamine of the present invention, the method of adding the stabilizer at the reaction step is not particularly limited and a known method may be employed. For example, the reaction may be started by previously introducing the stabilizer into a reactor or the stabilizer may be added as needed on the way of reaction. Also, the stabilizer may be added by dissolving or suspending it in a solvent together with the alkali compound and/or the salt of hydroxylamine.

In this reaction step, the reaction temperature is preferably from 0 to 80° C., more preferably from 5 to 50° C. If the reaction temperature exceeds 80° C., there may arise a problem such as decomposition of hydroxylamine, whereas if the reaction temperature is less than 0° C., the reaction rate decreases and this may cause a problem such as reduction in productivity.

The heat of reaction, which is generated accompanying the reaction between the salt of hydroxylamine and the alkali compound for use in the present invention, can be discharged outside the system by using water, warm water or a heat medium so as to keep the reaction temperature in a constant range. The heat discharged outside the system by using water, warm water or a heat medium is preferably used as a heat source for other equipment.

In the production process of a hydroxylamine of the present invention, the reaction step may be performed by a known method, for example, batch system, semi-batch system or continuous system.

Separation Step

The production process of a hydroxylamine of the present invention may comprise a step of separating insoluble substances from the hydroxylamine.

The insoluble substance is, for example, an insoluble substance precipitated in the reaction solution at the above-described reaction step.

Examples of the insoluble substance include a salt produced by the reaction between a salt of hydroxylamine and an alkali compound in the reaction step, a salt of hydroxylamine and an alkali compound.

That is, when a salt produced by the reaction between a salt of hydroxylamine and an alkali compound in the reaction step, a salt of hydroxylamine, an alkali compound or the like is precipitated as the insoluble substance resulting from the concentration becoming higher than the solubility, the production process may comprise a separation step of separating insoluble substances.

Insoluble substances precipitated in the steps other than the reaction step can also be separated in the same manner.

As for the separation method, a known method such as filtration, compression, centrifugation, sedimentation and floatation can be used. For example, the separation by filtration may be performed by natural filtration, filtration under pressure or filtration under reduced pressure, the separation by sedimentation may be performed by supernatant separation or precipitation concentration, and the separation by floatation may be performed by floatation under pressure or floatation using ionization.

Also, by washing the insoluble substance separated in the separation step of the present invention with a solvent, the hydroxylamine attached to or taken into the insoluble substance can be recovered.

The solvent used for washing the insoluble substance may be the same as the solvent used in the reaction step or may be a different solvent. The washing solvent which can be used includes water and/or an organic solvent. Examples of the organic solvent include a hydrocarbon, an ether, an ester and an alcohol, but if the recovery of hydroxylamine is not affected, the solvent is not limited thereto. Among these washing solvents, water and/or an alcohol are preferred. The amount of the washing solvent may be appropriately selected according to the conditions such as kind and amount of the insoluble substance and separation.

The temperature at the time of separating insoluble substances in the separation step is preferably from 0 to 80° C., more preferably from 5 to 50° C. If the temperature at the separation exceeds 80° C., there may arise a problem such as decomposition of the hydroxylamine, whereas if the temperature is less than 0° C., there may arise a problem, for example, a large energy becomes necessary for cooling.

A part or the whole of the filtrate resulting from separation of insoluble substances in the separation step and/or the filtrate resulting from washing of the insoluble substance may also be used as a solvent for dissolving or suspending a salt of hydroxylamine and/or an alkali compound which are reaction raw materials.

The separation step is, similarly to the reaction step, preferably performed in the presence of a stabilizer for the hydroxylamine. The stabilizer may be newly added in the separation step or the stabilizer added in the previous step may be used as it is.

As for the stabilizer, the same stabilizer as that used in the reaction step or a different stabilizer may be selected according to the condition or use. By adding a stabilizer, side reaction such as decomposition of the hydroxylamine due to metal impurities can be suppressed and the production efficiency of hydroxylamine is enhanced.

The amount of the stabilizer used is, in terms of a ratio by mass of the stabilizer to the hydroxylamine (stabilizer/hydroxylamine), suitably from $1.0 \times 10^{-9}$ to 1.0, preferably from $1.0 \times 10^{-8}$ to 0.1. If this ratio by mass is less than $1.0 \times 10^{-9}$, the effect of preventing the hydroxylamine from decomposition reaction due to metal impurities may not be obtained, whereas if the ratio by mass exceeds 1.0, removal or recovery of the excess stabilizer may be required.

In the production process of a hydroxylamine of the present invention, the separation step may be performed by a known method, for example, batch system, semi-batch system or continuous system.

Purification Step

The production process of a hydroxylamine of the present invention may comprise a step of purifying the hydroxylamine obtained as above.

For the purification, a known method such as distillation, ion exchange, electrodialysis, membrane separation, adsorption and crystallization can be used.

The distillation can be performed by a known method such as simple distillation, multistage distillation, steam distillation and flash distillation. By distilling the hydroxylamine-containing reaction solution with use of such a known method, a purified hydroxylamine can be obtained from the top, side or bottom of a distillation column.

For example, by simple or multistage distillation under reduced pressure, a purified hydroxylamine can be obtained from the top of a distillation column. Furthermore, by introducing steam into the distillation column and performing stripping, a purified hydroxylamine can also be obtained from the top of the distillation column. In addition, the purification can also be performed by concentrating the hydroxylamine-containing reaction solution in the column, taking out the hydroxylamine-containing vapor from the side at the column bottom and concentrating the vapor.

The ion exchange may be performed by a known method such as cation exchange, anion exchange and chelate exchange.

The purification by cation exchange can be performed by a known method using a strongly acidic cation exchange resin, a weakly acidic cation exchange resin or the like. The cation exchange resin is preferably used in the form of H type by previously subjecting it to an acid treatment.

The purification by anion exchange can be performed by a known method using a strongly basic anion exchange resin, a weakly basic anion exchange resin or the like. The anion exchange resin is preferably used in the form of OH type by previously subjecting it to an alkali treatment.

The purification by chelate exchange can be performed by a known method using a chelate exchange resin or the like. The chelate exchange resin is preferably used in the form of H type by previously subjecting it to an acid treatment.

The purification may also be performed by combining cation exchange, anion exchange and chelate exchange. For example, anion exchange may be performed after cation exchange, or cation exchange may be performed after anion exchange. Also, monobed resin or mixed bed resin obtained by mixing cation exchange resin and anion exchange resin may be used.

The temperature at the ion exchange is preferably from 0 to 70° C., more preferably from 5 to 50° C. If the ion exchange temperature exceeds 70° C., there may arise a problem such as decomposition of the hydroxylamine, whereas if the ion exchange temperature is less than 0° C., there may arise a problem, for example, a large energy becomes necessary for cooling.

The electrodialysis can be performed by a known method using a cation selective membrane, an anion selective membrane, a bipolar membrane or the like.

For example, in a two-compartment electrodialyzer comprising a two-compartment unit formed by alternately disposing an anion selective membrane and a cation selective membrane, where one compartment is used as a desalting compartment and the other compartment adjacent thereto is used as a concentration compartment, an aqueous hydroxylamine solution is supplied to the desalting compartment and by applying a current, the hydroxylamine can be purified.

The membrane separation can be performed by a known method using a semipermeable membrane or the like. For example, by passing an aqueous hydroxylamine solution through a semipermeable membrane, the hydroxylamine can be purified.

The adsorption and crystallization each can be performed by a known method.

A part of the hydroxylamine solution obtained in the purification step may be used as a solvent for dissolving or suspending a salt of hydroxylamine and/or an alkali compound which are reaction raw materials.

The purification step is, similarly to the reaction step, preferably performed in the presence of a stabilizer for the hydroxylamine. The stabilizer may be newly added in the purification step or the stabilizer added in the previous step may be used as it is.

As for the stabilizer, the same stabilizer as that used in the reaction step or a different stabilizer may be selected according to the condition or use. By adding a stabilizer, side reaction such as decomposition of the hydroxylamine due to metal impurities can be suppressed and the production efficiency of hydroxylamine is enhanced.

The amount of the stabilizer used is, in terms of a ratio by mass of the stabilizer to the hydroxylamine (stabilizer/hydroxylamine), suitably from $1.0 \times 10^{-9}$ to 1.0, preferably from $1.0 \times 10^{-8}$ to 0.1. If this ratio by mass is less than $1.0 \times 10^{-9}$, the effect of preventing the hydroxylamine from decomposition reaction due to metal impurities may not be obtained, whereas if the ratio by mass exceeds 1.0, removal or recovery of the excess stabilizer may be required.

In the production process of a hydroxylamine of the present invention, the purification step by ion exchange may be performed by a known method, for example, batch system, semi-batch system or continuous system.

Concentration Step

The production process of a hydroxylamine of the present invention may comprise a step of concentrating the hydroxylamine.

The concentration can be performed by a known method such as distillation, electrodialysis and membrane separation. In the production process of the present invention, the method in the purification step and the method in the concentration step may be the same or different. Also, purification and concentration may be performed at the same time. Preferably, the production process of the present invention comprises a step of concentrating the hydroxylamine by distillation at the column bottom.

The distillation can be performed by a known method such as simple distillation, multistage distillation, steam distillation and flash distillation.

For example, by simple distillation or multistage distillation, an aqueous solution containing a slight amount of hydroxylamine is distilled out from the column top and a hydroxylamine solution having a high hydroxylamine concentration can be obtained from the column bottom.

The distillation column may be a general plate column such as bubble cap tray column or sieve plate column or may be equipped with a general packing material such as Raschig ring, pearl ring and saddle body.

The distillation temperature is, in terms of temperature at the column bottom, preferably from 0 to 70° C., more preferably from 5 to 60° C. If the temperature at the column bottom exceeds 70° C., there may arise a problem such as decomposition of hydroxylamine, whereas if the temperature at the column bottom is less than 0° C., there may arise a problem, for example, a large energy becomes necessary for cooling.

The distillation pressure is determined according to the relationship with the temperature but this is, in terms of pressure at the column bottom, preferably from 0.5 to 60 kPa, more preferably from 0.8 to 40 kPa.

A part of the hydroxylamine solution obtained in the concentration step may be used as a solvent for dissolving or suspending a salt of hydroxylamine and/or an alkali compound which are reaction raw materials.

In some cases, a low-concentration hydroxylamine solution is obtained from the top or side of the distillation column, but a part or the whole thereof may be used as a solvent for dissolving or suspending a salt of hydroxylamine and/or an alkali compound which are reaction raw materials.

For example, by using distillation, an aqueous solution containing a slight amount of hydroxylamine is distilled out from the column top and an aqueous hydroxylamine solution having a high hydroxylamine concentration can be obtained from the column bottom. Depending on the distillation conditions, it is also possible to obtain an aqueous hydroxylamine solution having a high hydroxylamine concentration from the column top.

Depending on the distillation conditions, it is also possible to obtain an aqueous hydroxylamine solution having a high hydroxylamine concentration from the column top.

The concentration step is, similarly to the reaction step, preferably performed in the presence of a stabilizer for the hydroxylamine. The stabilizer may be newly added in the concentration step or the stabilizer added in the previous step may be used as it is.

As for the stabilizer, the same stabilizer as that used in the reaction step or a different stabilizer may be selected according to the condition or use. By adding a stabilizer, side reaction such as decomposition of the hydroxylamine due to metal impurities can be suppressed and the production efficiency of hydroxylamine is enhanced.

The amount of the stabilizer used is, in terms of a ratio by mass of the stabilizer to the hydroxylamine (stabilizer/hydroxylamine), suitably from $1.0 \times 10^{-9}$ to 1.0, preferably from $1.0 \times 10^{-8}$ to 0.1. If this ratio by mass is less than $1.0 \times 10^{-9}$, the effect of preventing the hydroxylamine from decomposition reaction due to metal impurities may not be obtained, whereas if the ratio by mass exceeds 1.0, removal or recovery of the excess stabilizer may be required.

In the production process of a hydroxylamine of the present invention, the concentration step may be performed by a known method, for example, batch system, semi-batch system or continuous system.

The production process of a hydroxylamine of the present invention may comprise a purification step of purifying by ion exchange the hydroxylamine obtained in the concentration step.

The ion exchange may be performed by a known method such as cation exchange, anion exchange and chelate exchange.

The purification by cation exchange can be performed by a known method using a strongly acidic cation exchange resin, a weakly acidic cation exchange resin or the like. The cation exchange resin is preferably used in the form of H type by previously subjecting it to an acid treatment.

The purification by anion exchange can be performed by a known method using a strongly basic anion exchange resin, a weakly basic anion exchange resin or the like. The anion exchange resin is preferably used in the form of OH type by previously subjecting it to an alkali treatment.

The purification by chelate exchange can be performed by a known method using a chelate exchange resin or the like. The chelate exchange resin is preferably used in the form of H type by previously subjecting it to an acid treatment.

The purification may also be performed by combining cation exchange, anion exchange and chelate exchange. For example, anion exchange may be performed after cation exchange or cation exchange may be performed after anion exchange. Also, monobed resin or mixed bed resin obtained by mixing cation exchange resin and anion exchange resin may be used.

The temperature at the ion exchange is preferably from 0 to 70° C., more preferably from 5 to 50° C. If the ion exchange temperature exceeds 70° C., there may arise a problem such as decomposition of the hydroxylamine, whereas if the ion exchange temperature is less than 0° C., there may arise a problem, for example, a large energy becomes necessary for cooling.

A part of the hydroxylamine solution obtained in the purification step may be used as a solvent for dissolving or suspending a salt of hydroxylamine and/or an alkali compound which are reaction raw materials.

This purification step is, similarly to the reaction step, preferably performed in the presence of a stabilizer for the hydroxylamine. The stabilizer may be newly added in the purification step or the stabilizer added in the previous step may be used as it is.

As for the stabilizer, the same stabilizer as that used in the reaction step or a different stabilizer may be selected according to the condition or use. By adding a stabilizer, side reaction such as decomposition of the hydroxylamine due to metal impurities can be suppressed and the production efficiency of hydroxylamine is enhanced.

The amount of the stabilizer used is, in terms of a ratio by mass of the stabilizer to the hydroxylamine (stabilizer/hydroxylamine), suitably from $1.0 \times 10^{-9}$ to 1.0, preferably from $1.0 \times 10^{-8}$ to 0.1. If this ratio by mass is less than $1.0 \times 10^{-9}$, the effect of preventing the hydroxylamine from decomposition reaction due to metal impurities may not be obtained, whereas if the ratio by mass exceeds 1.0, removal or recovery of the excess stabilizer may be required.

The production process of a hydroxylamine of the present invention comprises:

(1) a reaction step of reacting a salt of hydroxylamine with an alkali compound to obtain a hydroxylamine, (2) a purification step of purifying the hydroxylamine by ion exchange, and (3) a concentration step of concentrating the hydroxylamine by distillation at the column bottom, and these steps are preferably performed in the order of reaction step, purification step and concentration step. Also, the steps (1) to (3) may be performed in any order after the step (1) is performed, or the same step may be performed two or more times.

The production process of a hydroxylamine of the present invention may comprise (4) a separation step of separating insoluble substances from the hydroxylamine. This step is preferably performed between the reaction step and the purification step.

The concentration of hydroxylamine obtained by the process of the present invention is 10 mass % or more. Also, a hydroxylamine in a concentration of 20 mass % or more can be obtained, and even a hydroxylamine in a concentration of 40 mass % or more can be obtained.

In the hydroxylamine obtained by the process of the present invention, the content of each metal contained as an impurity is 1 ppm by mass or less. Also, a hydroxylamine where the content of each metal is 0.1 ppm by mass or less can be obtained, and even a hydroxylamine where the content of each metal is 0.01 ppm by mass or less can be obtained. The metal includes an alkali metal and an alkaline earth metal, which are originated in the alkali compound used in the reaction step, and also includes Fe or the like which outstandingly accelerates the decomposition of hydroxylamine.

In the hydroxylamine obtained by the process of the present invention, the content of each anion contained as an impurity is 100 ppm by mass or less. Also, a hydroxylamine where the content of each anion is 10 ppm by mass or less can be obtained, and even a hydroxylamine where the content of each anion is 1 ppm by mass or less can be obtained. The anion includes sulfate ion, chloride ion, nitrate ion and the like, which are originated in the salt of hydroxylamine used as a raw material.

In the hydroxylamine finally obtained by the present invention, a stabilizer may be newly added or the stabilizer added in the previous step may be used as it is. As for the stabilizer, the same stabilizer as that used in the reaction step or a different stabilizer may be selected according to the condition or use. By adding a stabilizer, side reaction such as decomposition of the hydroxylamine due to metal impurities can be suppressed and the production efficiency of hydroxylamine is enhanced.

EXAMPLES

The present invention is described in greater detail below by referring to Examples, but the present invention is not limited to these Examples.

Example 1

In a 1 L-volume glass-made reactor, 61.7 g (1.1 mol) of CaO, 1.45 g (0.01 mol) of 8-hydroxyquinoline and 332 g (18.4 mol) of $H_2O$ were charged and stirred at 20° C. At this time, the pH of the reaction solution was 12.8. To this reaction solution under stirring, a solution obtained by dissolving 164 g (2.0 mol) of hydroxylamine sulfate in 246 g (13.7 mol) of $H_2O$ was added while keeping the reaction solution at a pH of 7 or more. The time required for the addition was about 40 minutes. After the addition, the reaction was further allowed to proceed at 20° C. for 3 hours. The final pH of the reaction solution was 12.2.

After the completion of reaction, the reaction solution at 20° C. was filtered under reduced pressure to separate an insoluble solid from the reaction solution and the obtained solid was washed 5 times with 66.1 g (3.67 mol) of $H_2O$ at 20° C.

The reaction solution after separation of the insoluble solid and the solution resulting from washing of the solid separated were mixed and the obtained solution was analyzed by titration with hydrochloric acid. As a result, the hydroxylamine concentration in the mixed solution was 7.4 mass %. Accordingly, the amount of hydroxylamine obtained was 64.7 g (1.96 mol) and the yield of hydroxylamine based on hydroxylamine sulfate was 98%.

Example 2

The reaction was performed in the same manner as in Example 1 except for performing the reaction at 40° C. The final pH of the reaction solution was 12.2. After the completion of reaction, the reaction solution at 40° C. was filtered under reduced pressure to separate an insoluble solid from the reaction solution and the obtained solid was washed 5 times with 66.1 g (3.67 mol) of $H_2O$ at 40° C.

The reaction solution after separation of the insoluble solid and the solution resulting from washing of the solid separated were mixed and the obtained solution was analyzed by titration with hydrochloric acid. As a result, the hydroxylamine concentration in the mixed solution was 7.4 mass %. Accordingly, the amount of hydroxylamine obtained was 63.8 g (1.93 mol) and the yield of hydroxylamine based on hydroxylamine sulfate was 97%.

Example 3

The reaction was performed in the same manner as in Example 1 except for performing the reaction at 10° C. The final pH of the reaction solution was 12.2. After the completion of reaction, the reaction solution at 10° C. was filtered under reduced pressure to separate an insoluble solid from the reaction solution and the obtained solid was washed 5 times with 66.1 g (3.67 mol) of $H_2O$ at 10° C.

The reaction solution after separation of the insoluble solid and the solution resulting from washing of the solid separated were mixed and the obtained solution was analyzed by titration with hydrochloric acid. As a result, the hydroxylamine concentration in the mixed solution was 7.3 mass %. Accordingly, the amount of hydroxylamine obtained was 63.0 g (1.91 mol) and the yield of hydroxylamine based on hydroxylamine sulfate was 96%.

Example 4

In a 1 L-volume glass-made reactor, 61.7 g (1.1 mol) of CaO, 1.45 g (0.01 mol) of 8-hydroxyquinoline and 578 g (32.1 mol) of $H_2O$ were charged and stirred at 20° C. At this time, the pH of the reaction solution was 12.9. To this reaction solution under stirring, 164 g (2.0 mol) of hydroxylamine sulfate was added in the form of an intact solid while keeping the reaction solution at a pH of 7 or more. The time required for the addition was about 40 minutes. After the addition, the reaction was further allowed to proceed at 20° C. for 3 hours. The final pH of the reaction solution was 12.2.

After the completion of reaction, the reaction solution at 20° C. was filtered under reduced pressure to separate an insoluble solid from the reaction solution and the obtained solid was washed 5 times with 66.1 g (3.67 mol) of $H_2O$ at 20° C.

The reaction solution after separation of the insoluble solid and the solution resulting from washing of the solid separated were mixed and the obtained solution was analyzed by titration with hydrochloric acid. As a result, the hydroxylamine concentration in the mixed solution was 7.5 mass %. Accordingly, the amount of hydroxylamine obtained was 64.7 g (1.96 mol) and the yield of hydroxylamine based on hydroxylamine sulfate was 98%.

Example 5

The reaction was performed in the same manner as in Example 4 except for performing the reaction at 40° C. The final pH of the reaction solution was 12.2. After the completion of reaction, the reaction solution at 40° C. was filtered under reduced pressure to separate an insoluble solid from the reaction solution and the obtained solid was washed 5 times with 66.1 g (3.67 mol) of $H_2O$ at 40° C.

The reaction solution after separation of the insoluble solid and the solution resulting from washing of the solid separated were mixed and the obtained solution was analyzed by titration with hydrochloric acid. As a result, the hydroxylamine concentration in the mixed solution was 7.4 mass %. Accordingly, the amount of hydroxylamine obtained was 64.1 g (1.94 mol) and the yield of hydroxylamine based on hydroxylamine sulfate was 97%.

Example 6

The reaction was performed in the same manner as in Example 4 except for performing the reaction at 10° C. The final pH of the reaction solution was 12.3. After the completion of reaction, the reaction solution at 10° C. was filtered under reduced pressure to separate an insoluble solid from the reaction solution and the obtained solid was washed 5 times with 66.1 g (3.67 mol) of $H_2O$ at 10° C.

The reaction solution after separation of the insoluble solid and the solution resulting from washing of the solid separated were mixed and the obtained solution was analyzed by titration with hydrochloric acid. As a result, the hydroxylamine concentration in the mixed solution was 7.4 mass %. Accordingly, the amount of hydroxylamine obtained was 63.4 g (1.92 mol) and the yield of hydroxylamine based on hydroxylamine sulfate was 96%.

Example 7

In a 1 L-volume glass-made reactor, 61.7 g (1.1 mol) of CaO, 1.45 g (0.01 mol) of 8-hydroxyquinoline and 248 g (13.8 mol) of $H_2O$ were charged and stirred at 20° C. At this time, the pH of the reaction solution was 13.0. To this reaction solution under stirring, 164 g (2.0 mol) of hydroxylamine sulfate was added in the form of an intact solid while keeping the reaction solution at a pH of 7 or more. The time required for the addition was about 40 minutes. After the addition, the reaction was further allowed to proceed at 20° C. for 3 hours. The final pH of the reaction solution was 12.3.

After the completion of reaction, the reaction solution at 20° C. was filtered under reduced pressure to separate an insoluble solid from the reaction solution and the obtained solid was washed 5 times with 66.1 g (3.67 mol) of $H_2O$ at 20° C.

The reaction solution after separation of the insoluble solid and the solution resulting from washing of the solid separated were mixed and the obtained solution was analyzed by titration with hydrochloric acid. As a result, the hydroxylamine concentration in the mixed solution was 11.8 mass %. Accordingly, the amount of hydroxylamine obtained was 62.8 g (1.90 mol) and the yield of hydroxylamine based on hydroxylamine sulfate was 95%.

Example 8

The reaction was performed in the same manner as in Example 7 except for performing the reaction at 40° C. The final pH of the reaction solution was 12.3. After the completion of reaction, the reaction solution at 40° C. was filtered under reduced pressure to separate an insoluble solid from the reaction solution and the obtained solid was washed 5 times with 66.1 g (3.67 mol) of $H_2O$ at 40° C.

The reaction solution after separation of the insoluble solid and the solution resulting from washing of the solid separated were mixed and the obtained solution was analyzed by titration with hydrochloric acid. As a result, the hydroxylamine concentration in the mixed solution was 11.6 mass %. Accordingly, the amount of hydroxylamine obtained was 62.1 g (1.88 mol) and the yield of hydroxylamine based on hydroxylamine sulfate was 94%.

Example 9

The reaction was performed in the same manner as in Example 7 except for performing the reaction at 10° C. The final pH of the reaction solution was 12.3. After the completion of reaction, the reaction solution at 10° C. was filtered under reduced pressure to separate an insoluble solid from the reaction solution and the obtained solid was washed 5 times with 66.1 g (3.67 mol) of $H_2O$ at 10° C.

The reaction solution after separation of the insoluble solid and the solution resulting from washing of the solid separated were mixed and the obtained solution was analyzed by titration with hydrochloric acid. As a result, the hydroxylamine concentration in the mixed solution was 11.6 mass %. Accordingly, the amount of hydroxylamine obtained was 61.5 g (1.86 mol) and the yield of hydroxylamine based on hydroxylamine sulfate was 93%.

Example 10

An Na-type strongly acidic cation exchange resin (Amberlite IR120B, produced by Japan Organo Co., Ltd.) was packed into a polytetrafluoroethylene-made column, converted into H type by passing an aqueous 1N—HCl solution, and then thoroughly washed with $H_2O$. Through this strongly acidic cation exchange resin, an aqueous solution of hydroxylamine obtained in the same manner as in Example 1 was passed at a space velocity (SV) of 1/h. The resulting aqueous solution was analyzed by ICP-MS (Model SPQ-900, manufactured by Seiko Instruments Inc.), as a result, each concentration of impurities Na, Ca and Fe was 10 ppb by mass or less.

Example 11

The same procedure as in Example 10 was performed except for using an aqueous 1N—$H_2SO_4$ solution in place of the aqueous 1N—HCl solution. The same results were obtained.

Example 12

A Cl-type strongly basic anion exchange resin (Amberlite IRA900J, produced by Japan Organo Co., Ltd.) was packed into a polytetrafluoroethylene-made column, converted into OH type by passing an aqueous 1N—NaOH solution, and then thoroughly washed with H₂O. Through this strongly basic anion exchange resin, an aqueous solution of hydroxylamine obtained and deprived of impurity metal ion in the same manner as in Example 10 was passed at a space velocity (SV) of 1/h.

The resulting aqueous solution was analyzed by titration with hydrochloric acid, as a result, the hydroxylamine concentration was 7 mass %. Also, this aqueous solution was analyzed by anion chromatography (SHODEX IC SI-90 4E, produced by Showa Denko K.K.), as a result, each concentration of impurities sulfate ion and chloride ion was 1.0 ppm by mass or less.

Example 13

An aqueous solution of hydroxylamine obtained in the same manner as in Example 12 was further concentrated by distillation under reduced pressure. The degree of pressure reduction was adjusted to give a column bottom temperature of 30° C. or less. Water was extracted from the column top and an aqueous solution having a high hydroxylamine concentration was recovered from the column bottom.

The bottom solution obtained was analyzed by titration with hydrochloric acid, as a result, the hydroxylamine concentration was 51 mass %.

Example 14

An Na-type strongly acidic cation exchange resin (Amberlite IR120B, produced by Japan Organo Co., Ltd.) was packed into a polytetrafluoroethylene-made column, converted into H type by passing an aqueous 1N—HCl solution, and then thoroughly washed with H₂O. Through this strongly acidic cation exchange resin, an aqueous solution of hydroxylamine obtained in the same manner as in Example 13 was passed at a space velocity (SV) of 1/h.

The resulting aqueous solution was analyzed by titration with hydrochloric acid, as a result, the hydroxylamine concentration was 51 mass %. Also, this aqueous solution was analyzed by ICP-MS (Model SPQ-900, manufactured by Seiko Instruments Inc.), as a result, each concentration of impurities Na, Ca and Fe was 10 ppb by mass or less.

Example 15

A Cl-type strongly basic anion exchange resin (Amberlite IRA900J, produced by Japan Organo Co., Ltd.) was packed into a polytetrafluoroethylene-made column, converted into OH type by passing an aqueous 1N—NaOH solution, and then thoroughly washed with H₂O. Through this strongly basic anion exchange resin, an aqueous solution of hydroxylamine obtained and deprived of impurity metal ion in the same manner as in Example 14 was passed at a space velocity (SV) of 1/h.

The resulting aqueous solution was analyzed by titration with hydrochloric acid, as a result, the hydroxylamine concentration was 51 mass %. Also, this aqueous solution was analyzed by anion chromatography (SHODEX IC SI-90 4E, produced by Showa Denko K.K.), as a result, each concentration of impurities sulfate ion and chloride ion was 1.0 ppm by mass or less.

Example 16

A monobed resin (Amberlite ESG-1, ultrapure water grade, produced by Japan Organo Co., Ltd.) was packed into a polytetrafluoroethylene-made column and thoroughly washed with H₂O. Through this monobed resin, an aqueous solution of hydroxylamine obtained in the same manner as in Example 13 was passed at a space velocity (SV) of 1/h.

The resulting aqueous solution was analyzed by titration with hydrochloric acid, as a result, the hydroxylamine concentration was 51 mass %. Also, this aqueous solution was analyzed by ICP-MS (Model SPQ-900, manufactured by Seiko Instruments Inc.), as a result, each concentration of impurities sulfate ion and chloride ion was 1.0 ppm by mass or less.

Example 17

In a 2 L-volume glass-made reactor, 61.7 g (1.10 mol) of CaO, 0.041 g (0.28 mmol) of 8-hydroxyquinoline and 350 g (19.4 mol) of H₂O were charged and stirred at 20° C. At this time, the pH of the reaction solution was 12.8. To this reaction solution under stirring, 164 g (2.0 mol) of hydroxylamine sulfate in 465 g (25.8 mol) of H₂O was added while keeping the reaction solution at a pH of 7 or more. The time required for the addition was about 40 minutes. After the addition, the reaction was further allowed to proceed at 20° C. for 3 hours. The final pH of the reaction solution was 12.2.

After the completion of reaction, the reaction solution at 20° C. was filtered under reduced pressure to separate an insoluble solid from the reaction solution and the obtained solid was washed 5 times with 66.1 g (3.67 mol) of H₂O at 20° C.

The reaction solution after separation of the insoluble solid and the solution resulting from washing of the solid separated were mixed and the obtained solution was analyzed by titration with hydrochloric acid. As a result, the hydroxylamine concentration in the mixed solution was 4.8 mass %. Accordingly, the amount of hydroxylamine obtained was 64.7 g (1.96 mol) and the yield of hydroxylamine based on hydroxylamine sulfate was 98%.

Example 18

In a 1 L-volume glass-made reactor, 220 g of an aqueous 20 mass % NaOH solution (NaOH: 1.1 mol) and 0.73 g (0.005 mol) of 8-hydroxyquinoline were charged and stirred at 20° C. While stirring this reaction solution, a solution obtained by dissolving 82.1 g (1.0 mol) of hydroxylamine sulfate in 465 g (25.8 mol) of H₂O was added over about 40 minutes. After the addition, the reaction was further allowed to proceed at 20° C. for 3 hours.

The reaction solution was analyzed by titration with hydrochloric acid. As a result, the hydroxylamine concentration was 4.2 mass %. Accordingly, the amount of hydroxylamine obtained was 32.4 g (0.98 mol) and the yield of hydroxylamine based on hydroxylamine sulfate was 98%.

Example 19

An Na-type strongly acidic cation exchange resin (Amberlite IR120B, produced by Japan Organo Co., Ltd.) was packed into a polytetrafluoroethylene-made column, converted into H type by passing an aqueous 1N—HCl solution, and then thoroughly washed with H₂O. Through this strongly acidic cation exchange resin, an aqueous solution of hydroxylamine obtained in the same manner as in Example 18 was passed at a space velocity (SV) of 1/h. The resulting aqueous solution was analyzed by ICP-MS (Model SPQ-900, manufactured by Seiko Instruments Inc.), as a result, each concentration of impurities Na, Ca and Fe was 10 ppb by mass or less.

Example 20

The same procedure as in Example 19 was performed except for using an aqueous 1N—$H_2SO_4$ solution in place of the aqueous 1N—HCl solution. The same results were obtained.

Example 21

A Cl-type strongly basic anion exchange resin (Amberlite IRA900J, produced by Japan Organo Co., Ltd.) was packed into a polytetrafluoroethylene-made column, converted into OH type by passing an aqueous 1N—NaOH solution, and then thoroughly washed with $H_2O$. Through this strongly basic anion exchange resin, an aqueous solution of hydroxylamine obtained and deprived of impurity metal ion in the same manner as in Example 19 was passed at a space velocity (SV) of 1/h.

The resulting aqueous solution was analyzed by titration with hydrochloric acid, as a result, the hydroxylamine concentration was 4.0 mass %. Also, this aqueous solution was analyzed by anion chromatography (SHODEX IC SI-90 4E, produced by Showa Denko K.K.), as a result, each concentration of impurities sulfate ion and chloride ion was 1.0 ppm by mass or less.

Example 22

An aqueous solution of hydroxylamine obtained in the same manner as in Example 21 was further concentrated by distillation under reduced pressure. The degree of pressure reduction was adjusted to give a bottom temperature of 30° C. or less. Water was extracted from the column top and an aqueous solution having a high hydroxylamine concentration was recovered from the column bottom.

The bottom solution obtained was analyzed by titration with hydrochloric acid, as a result, the hydroxylamine concentration was 51 mass %.

Example 23

An Na-type strongly acidic cation exchange resin (Amberlite IR120B, produced by Japan Organo Co., Ltd.) was packed into a polytetrafluoroethylene-made column, converted into H type by passing an aqueous 1N—HCl solution, and then thoroughly washed with $H_2O$. Through this strongly acidic cation exchange resin, an aqueous solution of hydroxylamine obtained in the same manner as in Example 22 was passed at a space velocity (SV) of 1/h.

The resulting aqueous solution was analyzed by titration with hydrochloric acid, as a result, the hydroxylamine concentration was 51 mass %. Also, this aqueous solution was analyzed by ICP-MS (Model SPQ-900, manufactured by Seiko Instruments Inc.), as a result, each concentration of impurities Na, Ca and Fe was 10 ppb by mass or less.

Example 24

A Cl-type strongly basic anion exchange resin (Amberlite IRA900J, produced by Japan Organo Co., Ltd.) was packed into a polytetrafluoroethylene-made column, converted into OH type by passing an aqueous 1N—NaOH solution, and then thoroughly washed with $H_2O$. Through this strongly basic anion exchange resin, an aqueous solution of hydroxylamine obtained and deprived of impurity metal ion in the same manner as in Example 23 was passed at a space velocity (SV) of 1/h.

The resulting aqueous solution was analyzed by titration with hydrochloric acid, as a result, the hydroxylamine concentration was 51 mass %. Also, this aqueous solution was analyzed by anion chromatography (SHODEX IC SI-90 4E, produced by Showa Denko K.K.), as a result, each concentration of impurities sulfate ion and chloride ion was 1.0 ppm by mass or less.

Example 25

A monobed resin (Amberlite ESG-1, ultrapure water grade, produced by Japan Organo Co., Ltd.) was packed into a polytetrafluoroethylene-made column and thoroughly washed with $H_2O$. Through this monobed resin, an aqueous solution of hydroxylamine obtained in the same manner as in Example 22 was passed at a space velocity (SV) of 1/h.

The resulting aqueous solution was analyzed by titration with hydrochloric acid, as a result, the hydroxylamine concentration was 51 mass %. Also, this aqueous solution was analyzed by ICP-MS (Model SPQ-900, manufactured by Seiko Instruments Inc.), as a result, each concentration of impurities sulfate ion and chloride ion was 1.0 ppm by mass or less.

Comparative Example 1

In a 1 L-volume glass-made reactor, 164 g (2.0 mol) of hydroxylamine sulfate and 246 g (13.7 mol) of $H_2O$ were charged and stirred at 20° C. At this time, the pH of the reaction solution was 3.3. While stirring this reaction solution, 61.7 g (1.1 mol) of CaO, 1.45 g (0.01 mol) of 8-quinolinol and 332 g (18.4 mol) of $H_2O$ were added. The time required for the addition was about 40 minutes. The pH immediately after the completion of addition was 3.8. After the addition, the reaction was further allowed to proceed at 20° C. for 3 hours. The final pH of the reaction solution was 12.2.

After the completion of reaction, the reaction solution at 20° C. was filtered by suction to separate an insoluble solid from the reaction solution and the obtained solid was washed 5 times with 66.1 g (3.67 mol) of $H_2O$ at 20° C.

The reaction solution after separation of the insoluble solid and the solution resulting from washing of the solid separated were mixed and the obtained solution was analyzed by titration with hydrochloric acid. As a result, the hydroxylamine concentration in the mixed solution was 3.9 mass %. Accordingly, the amount of hydroxylamine obtained was 33.0 g (1.0 mol) and the yield of hydroxylamine based on hydroxylamine sulfate was 50%.

The invention claimed is:

1. A process for producing a hydroxylamine by reacting a salt of hydroxylamine with an alkali compound, comprising
    a reaction step of reacting a salt of hydroxylamine with an alkali compound while keeping the reaction solution at a ph of 7 or more,
    a concentration step of concentrating the hydroxylamine, and
    a purification step of purifying the hydroxylamine by ion exchange after said concentration step.

2. A process for producing a hydroxylamine by reacting a salt of hydroxylamine with an alkali compound, comprising a reaction step of performing the reaction by adding a salt of hydroxylamine to a reaction solution containing an alkali compound, wherein said reaction step is performed while keeping the reaction solution at a ph of 7 or more.

3. The process for producing a hydroxylamine as claimed in claims 1 or 2, wherein said alkali compound is at least one compound selected from the group consisting of an alkali metal compound, an alkaline earth metal compound, an ammonia and an amine.

4. The process for producing a hydroxylamine as claimed in claims 1 or 2, wherein said salt of hydroxylamine is at least one salt selected from the group consisting of hydroxylamine sulfate, hydroxylamine hydrochloride, hydroxylamine nitrate and hydroxylamine phosphate.

5. The process for producing a hydroxylamine as claimed in claims 1 or 2, wherein the reaction temperature at said reaction step is from 0 to 80° C.

6. The process for producing a hydroxylamine as claimed in claims 1 or 2, wherein said reaction step is performed in the presence of a solvent containing water and/or an alcohol.

7. The process for producing a hydroxylamine as claimed in claims 1 or 2, wherein said reaction step is performed in the presence of a stabilizer.

8. The process for producing a hydroxylamine as claimed in claims 1 or 2, which comprises a separation step of separating insoluble substances from the hydroxylamine.

9. The process for producing a hydroxylamine as claimed in claim 8, wherein the temperature at said separation step is from 0 to 80° C.

10. The process for producing a hydroxylamine as claimed in claim 8, wherein at least a part of the reaction solution after separating insoluble substances in said separation step is used as a solvent for dissolving or suspending a salt of hydroxylamine and/or an alkali compound which are reaction raw materials.

11. The process for producing a hydroxylamine as claimed in claims 1 or 2, which comprises a purification step of purifying the hydroxylamine.

12. The process for producing a hydroxylamine as claimed in claim 11, wherein said purification step is a step of purifying the hydroxylamine by at least one method selected from the group consisting of distillation, ion exchange, electrodialysis, membrane separation, adsorption and crystallization.

13. The process for producing a hydroxylamine as claimed in claim 11, wherein at least a part of the hydroxylamine solution obtained in said purification step is used as a solvent for dissolving or suspending a salt of hydroxylamine and/or an alkali compound which are reaction raw materials.

14. The process for producing a hydroxylamine as claimed in claim 1 wherein said concentration step is a step of concentrating the hydroxylamine by distillation at the column bottom.

15. The process for producing a hydroxylamine as claimed in claim 1, wherein the temperature at said concentration step is from 0 to 70° C.

16. The process for producing a hydroxylamine as claimed in claim 1, wherein at least a part of the hydroxylamine solution obtained in said concentration step is used as a solvent for dissolving or suspending a salt of hydroxylamine and/or an alkali compound which are reaction raw materials.

17. A process for producing a hydroxylamine, comprising a reaction step of reacting a salt of hydroxylamine with an alkali compound to obtain a hydroxylamine, a purification step of purifying the hydroxylamine by ion exchange, and a concentration step of concentrating the hydroxylamine by distillation at the column bottom.

18. The process for producing a hydroxylamine as claimed in claim 17, wherein said steps for producing a hydroxylamine are performed in the order of a reaction step, a purification step and a concentration step.

19. The process for producing a hydroxylamine as claimed in claim 17, wherein each of said steps is performed in the presence of a stabilizer.

20. The process for producing a hydroxylamine as claimed in claim 17, which comprises a separation step of separating insoluble substances from the hydroxylamine.

21. The process for producing a hydroxylamine as claimed in claim 20, wherein the temperature at said separation step is from 0 to 80° C.

22. The process for producing a hydroxylamine as claimed in claim 20, wherein said steps for producing a hydroxylamine are performed in the order of a reaction step, a separation step, a purification step and a concentration step.

23. The process for producing a hydroxylamine as claimed in claim 20, wherein each of said steps is performed in the presence of a stabilizer.

24. The process for producing a hydroxylamine as claimed in claim 20, wherein at least a part of the reaction solution after separating insoluble substances in said separation step is used as a solvent for dissolving or suspending a salt of hydroxylamine and/or an alkali compound which are reaction raw materials.

25. The process for producing a hydroxylamine as claimed in claim 17, wherein said reaction step is performed while keeping the reaction solution at a pH of 7 or more.

26. The process for producing a hydroxylamine as claimed in claim 25, wherein said reaction step is a step of adding a salt of hydroxylamine to a reaction solution containing an alkali compound.

27. The process for producing a hydroxylamine as claimed in claim 17, wherein the reaction temperature at said reaction step is from 0 to 80° C.

28. The process for producing a hydroxylamine as claimed in claim 17, wherein said reaction step is performed in the presence of a solvent containing water and/or an alcohol.

29. The process for producing a hydroxylamine as claimed in claim 17, wherein the temperature at said purification step is from 0 to 70° C.

30. The process for producing a hydroxylamine as claimed in claim 17, wherein at least a part of the hydroxylamine solution obtained in said purification step is used as a solvent for dissolving or suspending a salt of hydroxylamine and/or an alkali compound which are reaction raw materials.

31. The process for producing a hydroxylamine as claimed in claim 17, wherein the temperature at said concentration step is from 0 to 70° C.

32. The process for producing a hydroxylamine as claimed in claim 17, wherein at least a part of the hydroxylamine solution obtained in said concentration step is used as a solvent for dissolving or suspending a salt of hydroxylamine and/or an alkali compound which are reaction raw materials.

33. The process for producing a hydroxylamine as claimed in claim 17, which further comprises a purification step of purifying the hydroxylamine by ion exchange after said concentration step.

34. The process for producing a hydroxylamine as claimed in claim 33, wherein the temperature at said purification step after the concentration step is from 0 to 70° C.

35. The process for producing a hydroxylamine as claimed in claim 17, wherein said salt of hydroxylamine is at least one compound selected from the group consisting of hydroxylamine sulfate, hydroxylamine hydrochloride, hydroxylamine nitrate and hydroxylamine phosphate.

36. The process for producing a hydroxylamine as claimed in claim 17, wherein said alkali compound is at least one compound selected from the group consisting of an alkali metal compound, an alkaline earth metal compound, an ammonia and an amine.

* * * * *